United States Patent [19]

Eguchi

[11] Patent Number: 4,955,289
[45] Date of Patent: Sep. 11, 1990

[54] TEA LEAVES FIRING EQUIPMENT

[76] Inventor: Shohei Eguchi, Kho 4397-banchi, Oazu-Shimojuku, Ureshino-machi, Fujitsu-gun, Saga-ken 843-03, Japan

[21] Appl. No.: 325,702

[22] Filed: Mar. 20, 1989

[51] Int. Cl.$^5$ .................................................. A23F 3/16
[52] U.S. Cl. .................................... 99/483; 99/289 R; 99/516
[58] Field of Search .............. 99/279, 483, 485, 323.4, 99/467, 472, 474, 975, 476, 289 R, 516; 426/435, 436, 447

[56] References Cited

U.S. PATENT DOCUMENTS

| | | | |
|---|---|---|---|
| 4,809,596 | 3/1989 | Akutsu | 99/483 |
| 4,817,518 | 4/1989 | Wyatt | 99/483 |
| 4,823,767 | 4/1989 | Wust | 99/467 |

*Primary Examiner*—Robert W. Jenkins
*Attorney, Agent, or Firm*—Jordan and Hamburg

[57] ABSTRACT

Tea leaves are steamed out under pressure higher than atmospheric by means of steam generated from the moisture contained in the tea leaves for tea manufacturing. A round disk with a net on the discharge side of a rotary firing pot is horizontally shifted with a guide driven by air pressure or hydraulic cylinder, or vertically moved together with the horizontal shifting mechanism as a body. A raw tea leaves feeding cylinder is inclined from the top of the opening/closing cover to contact the central opening section of the round disk with the net, and the raw tea leaves are easily fed by means of a tilted charging chute. This tilted charging chute facilitates opening and closing of the disk with the net on the discharge side of the rotary firing pot to effectively make it airtight and further to effect the feeding of raw tea leaves.

8 Claims, 4 Drawing Sheets

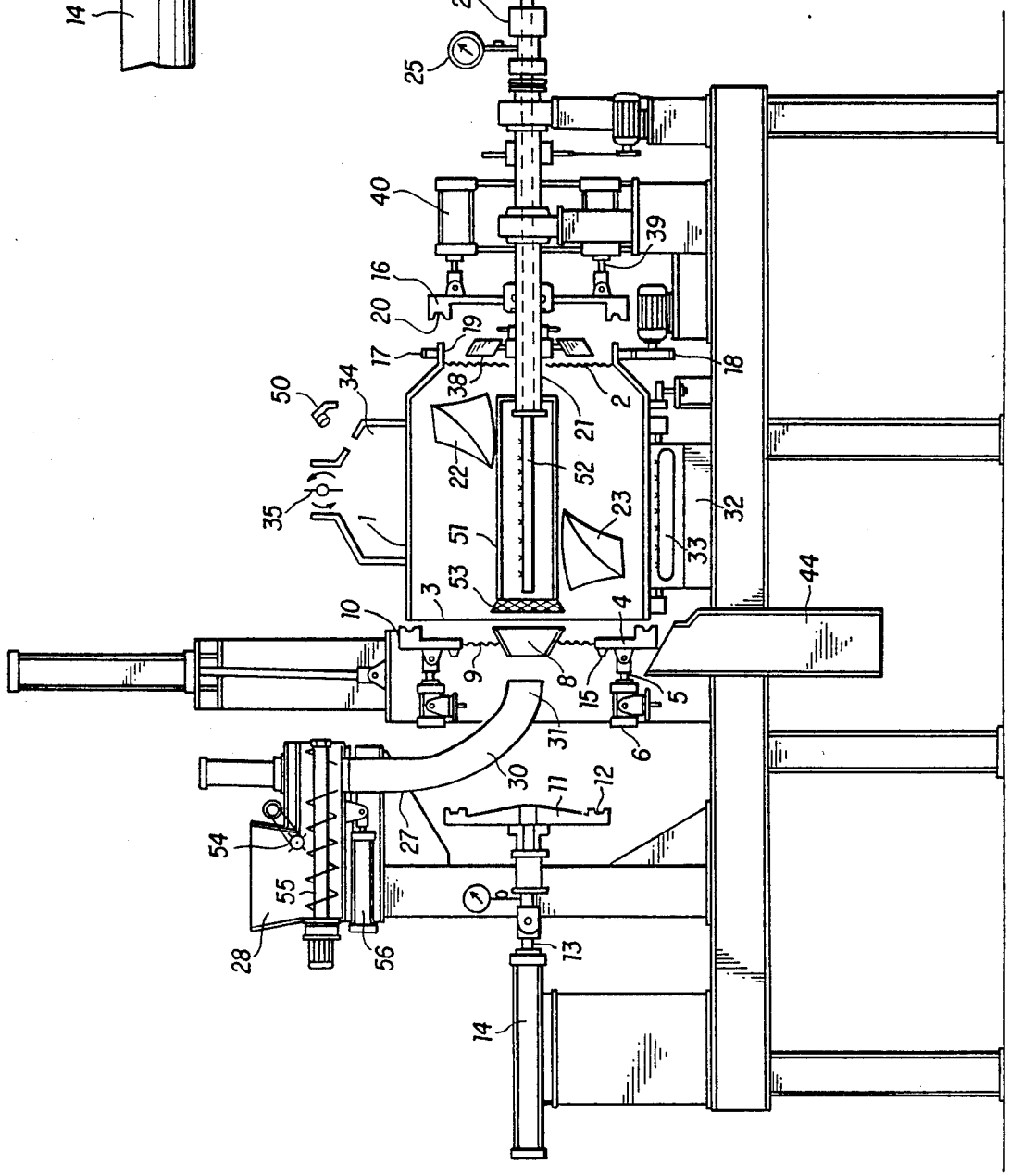

TEA LEAVES FIRING EQUIPMENT

BACKGROUND OF THE INVENTION

This invention relates to a tea processing method. In detail, this is a tea manufacturing method employing firing and rubbing where raw tea leaves are steamed in a firing pot, and infused to yield an aroma inherent to pot firing tea, combined with a taste not having tea harshness characteristic of steam heated tea.

There are two conventional tea manufacturing methods: the steam heating method and the pot firing method. In the former, raw tea leaves are subjected to heated steam to destroy the oxidized enzyme in the tea leaves, after which water drops attached on the surface of the tea leaves are removed. Then they are dried through rough, middle, and fine rubbings to obtain tea leaves of elongated shape. In the latter, raw tea leaves are heated as they are, and the steam generated by the moisture in the raw tea leaves is enclosed with the tea leaves to destroy the oxidized enzyme of the raw tea leaves, eliminate the steam, and infuse the tea leaves.

As to the pot firing method, there are the Aoyagi Method and Ureshino Method. The present inventor has investigated the Ureshino Method. Although this is a sort of pot firing method, it is such that in the initial firing process, a large amount of tea leaves are first agitated and, immediately after the volatilized portion is released, the tea leaves are further agitated to enclose the steam within the tea leaves. This point is called "cross". The high quality of the tea products depends upon treating the tea leaves at high temperature during this "cross" time without scorching. The steam generated by the moisture contained in the tea leaves becomes saturated in the tea leaves to evenly heat the cores of the tea leaves up to about 98 degrees centigrade, resulting in inert oxidized enzyme.

Furthermore, since the inert oxidized enzyme is not caused by saturated steam from the outside, no steam drops attach to the tea leaves, which is different from the steam heating method. In other words, no "mure" takes place, enabling continuous heating.

The present inventor investigated the Ureshino method and invented a manufacturing process disclosed in Japanese Publication of Examined Pat. application No. SH059-46572 and manufacturing equipment described in Japanese Publication of Examined Pat. application No. SH059-27751 and Japanese Publication of Unexamined Pat. application No. SH059-161400.

Afterward, the present inventor further studied how to increase the "cross" temperature. By heating an air-tight firing pot, saturated steam of a higher temperature than steam under atmospheric pressure can be obtained from the moisture in the tea leaves. This saturated steam and residual moisture in the tea leaves get together to produce a high temperature. Thus, the temperature of tea leaves can be increased up to more than 98 degrees centigrade in a short time. It was also found that the steam temperature enables heat to permeate the cores of the tea leaves, resulting in complete inert oxidation enzyme.

More concretely, when tea leaves are heated and fired in a firing pot being oscillated, the firing pot is made air-tight. Consequently, saturated steam at a higher temperature than steam under atmospheric pressure can be obtained by utilizing the moisture contained in the raw tea leaves in the air-tight firing pot. The tea leaves firing method utilizing high temperature steam as well as the residual moisture in the tea leaves was thus discovered. (Japanese Publication of Unexamined Pat. application No. SH062-195248).

However, as a result of succeeding study, the equipment was found to have some inconveniences in actual operation, such as opening and closing of a round disk with a net on the discharge side of the rotary firing pot and air-tight covers, raw tea leaves charging mechanism, heating method, raw tea leaves supply system, fired tea leaves transfer method, and fired tea leaves cooling mechanism.

SUMMARY OF THE INVENTION

The purpose of this invention is to steam out tea leaves under a pressure higher than atmospheric by means of steam generated from the moisture contained in the tea leaves for tea manufacturing, and to provide a tea manufacturing method to fully destroy oxidized enzyme to fix chlorophyll, resulting in production of tea leaves having a dense but not harsh flavor.

A second purpose of the invention is to provide a tea manufacturing method for tea leaves firing, steaming, infusion, and other necessary processes, and equipment which can realize such operation quickly, simply, and exactly.

In accordance with the invention, the round disk with a net on the discharge side of the rotary firing pot is horizontally shifted with a guide driven by air pressure or hydraulic cylinder, or vertically moved together with the horizontal shifting mechanism as a body. Then, a raw tea leaves feeding cylinder is inclined from the top of the opening/closing cover to contact the central opening section of the round disk with net, and the raw tea leaves are easily fed by means of a tilted charging chute. This tilted charging chute facilitates opening/closing of the disk with net on the discharge side of the rotary firing pot, to effectively make it air tight, and further to effect the feeding of raw tea leaves.

This invention relates to a tea leaves firing equipment with the following features. A tea leaves firing pot is open on one side, equipped with a netting cylinder on the other side, and is installed so as to rotate universally. It is contacted with a firing bag having a heating unit, and is provided with a leaves collecting plate inside. On the discharge side of this cylindrical-type firing pot, there is a coupling section on the edge of the periphery of the firing pot body, and at its center there is an opening. Around it there are a disk with a netting mechanism and air-tight covers having a coupling section with the netting disk.

These are provided so as to enable horizontal movement by air pressure or hydraulic cylinder. A netting disk is provided with a guide. The netting disk is installed so that it can be horizontally moved with the guide or be vertically lifted together with the horizontal shifting mechanism as a body, after the coupling section of the pot itself is disconnected by a horizontal shifting cylinder. On one side of the netting disk and the air-tight cover, a raw tea leaves transfer section is extended so that a raw tea leaves charging cylinder is shifted towards the central opening section of the netting disk by half tilting. A raw tea leaves supply section can be horizontally shifted to the position where its end touches the same place. The raw tea leaves supply section is a tilting chute. On the other hand, on the net side of the firing pot there is an edge portion with the airtight cover which can be horizontally shifted by air pressure or hydraulic cylinder.

Furthermore, as heating means for the firing pot, in addition to a firing bag provided outside the pot itself, a far infrared ray heating cylinder is installed inside the pot itself to heat and fire tea leaves at high temperature evenly, quickly, and in good quality.

As a raw tea leaves charging and supplying means, a raw tea leaves receiving hopper is provided in front of a raw tea leaves supplying, turning and flexible chute. In order to prevent clogging of raw tea leaves between the hopper and a supplying screw, a raw tea leaves agitator is installed at the place where these two units meet. The horizontal relative position for the raw tea leaves receiving hopper and the supplying screw can be changed so that the raw tea leaves supply device can prevent the clogging of raw tea leaves.

For the tea leaves discharge conveyor of this equipment, a universal net hanger conveyor is provided not only to enable the transfer of a large amount of tea leaves, but for good ventilation and cooling. In addition to the hanger conveyor, a tea leaves transfer conveyor is provided to prevent the tea leaves from falling down from the net by the turning force of the net at the time of tilting at the end of transfer, which may otherwise cause clogging of the tea leaves.

In the firing tea leaves discharge conveyor section and conveyor loading section neighboring the firing pot main body, is provided a fan which can properly distribute the firing leaves onto the conveyor and serves as cooling for the firing leaves. This unit prevents adherence or clogging of firing leaves on the chute section, and enables proper loading on the conveyor and proper cooling.

Furthermore, this equipment employs a control device to control the following to automatically produce fired leaves. That is, the inside temperature and pressure of the firing pot; regular and reverse rotation of the firing pot; lifting and shifting of the netting disk; mounting and dismounting of the air-tight covers; operating and stopping of the raw tea leaves supply unit; adjusting of heating; operating and stopping of a blowing and exhausting fan; a series of operating and stopping the conveyor speed; and continuous operation or stoppage.

BRIEF DESCRIPTION OF THE DRAWINGS

The invention will be better understood by reference to the accompanying drawings, in which:

FIG. 3 is an enlarged side view illustrating the fitting of the air-tight cover and rotating netting disk of the embodiment shown in FIGS. 1 and 2;

FIG. 4 is a front sectional view of a second embodiment of a tea leaves firing equipment of the present invention.

DETAILED DESCRIPTION OF THE INVENTION

Figure 1:
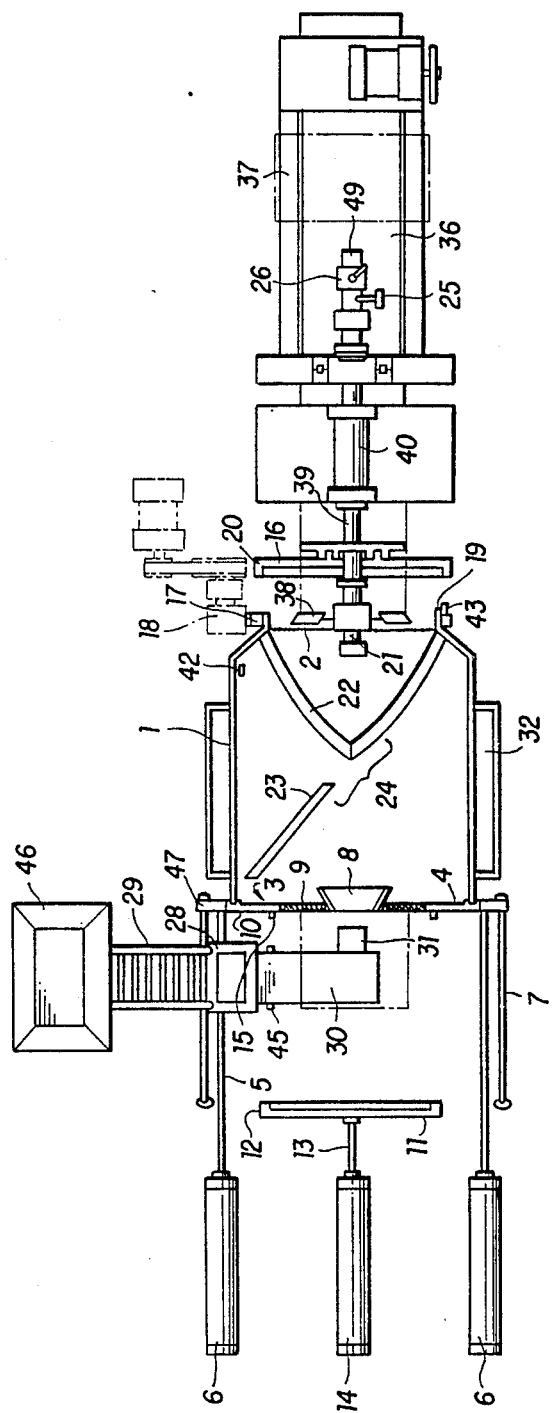
FIG. 1 is a top plan view of one embodiment of a tea leaves firing equipment for practicing the method of the present invention.
Figure 2:
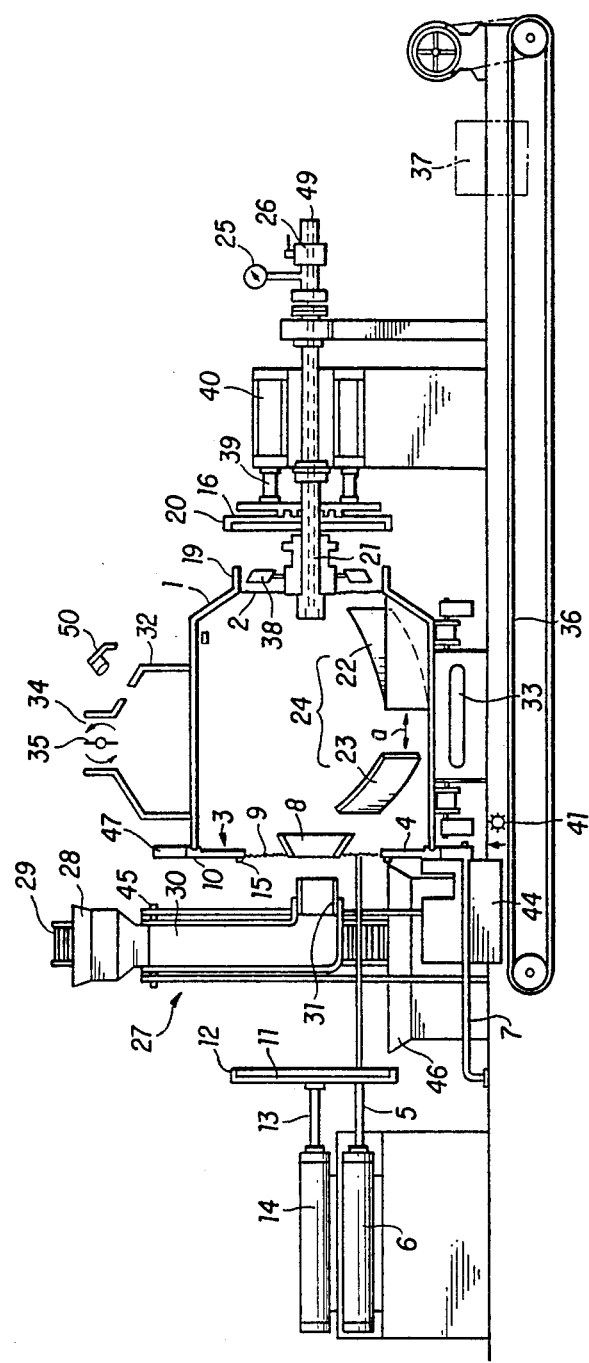
FIG. 2 is a side plan view of the equipment shown in FIG. 1.

The equipment shown in FIGS. 1 to 3 is mainly composed of a firing pot section, raw tea leaves supply section, heating section, and fired leaves collecting section. A firing pot body 1 is a cylindrical pot made of a heat-insulated, high thermal conductivity steel structure. One side is open and another side consists of netting surface 2. At the firing pot open side, a round disk 4 can be connected or disconnected with the opening of the firing pot body. Outer frame 47 of the netting round disk 4 is connected to cylinder shaft 5 so as to move horizontally by air pressure or hydraulic unit 6. A penetrating hole is provided on one end of the netting round disk outer frame 47 so that the netting round disk 4 can be shifted along a guide 7 horizontally fixed on the stand to exactly fit the opening of the rotating firing pot body 1. The netting round disk frame 47 and the netting round disk 4 are fixed with ball bearings so that outer frame 47 remains still even if the netting round disk rotates with the firing pot body itself.

This netting round disk 4 has an opening 8 on the central section and net 9 on the circumference. On the peripheral edge frame is provided fitting section 10 of the netting disk which fits discharge section 3 of the firing pot. In addition, there is a projected section 15 on the peripheral edge. Outside of this netting round disk 4, is provided a plate-shaped air-tight cover 11 which covers the net section 9 of the netting round disk 4 and the opening 8 of the disk by coupling air-tight fitting section 12 on the peripheral edge of the air-tight cover 11 with the projected section 15 on the net edge of the disk 4. Cylinder rod 13 connects with airtight cover 11 and can be horizontally moved with air compressor or hydraulic unit 14 to disconnect the fitting section 12. Cylinder rod 13 can be kept stationary by means of ball bearings or the like even if the air-tight cover 11 rotates with the netting around disk 4. On the connecting section between the cylinder rod 13 and the air-tight cover 11, is installed a shock absorber 48 such as a spring, etc., as illustrated in FIG. 3. This serves to facilitate fitting of the air-tight cover 11 onto the rotating netting disk 4.

On the net face 2 side, opposite the discharge side of the pot body 1, is provided an air-tight cover 16 which can move horizontally so as to cover or release the net face 2 side.

During the operation of firing leaves, for example, a gear 17 is provided on the outer surface of the pot body 1, and is made to rotate, coupled with a rotating drive gear 18.

The air-tight cover 16 has a projection 19 and fitting section 20 on the peripheral edge of the firing pot body 1. The cylinder rod 39 connected to the air-tight cover 16 can be horizontally moved by a hydraulic unit or air compressor 40. The connection between the air-tight cover 16 and the cylinder rod 39 is by the same mechanism as that between the air-tight cover 11 and the cylinder rod 13, that is, the cylinder rod 39 remains stationary even if the air-tight cover 16 rotates followed by rotation of the pot body 1. Air-tight cover 16 is moved along a steel pipe 21 projected outside from the pot body 1.

In the inside of the firing pot body 1, is provided a leaves collecting plate 24 which consists of triangle shaped plate 22 and thin plate 23. The bottom of the triangle shaped plate 22 is adjacent to the net section of the pot body 1. The thin plate 23 is placed up to the discharge side of the pot body 1, at a position extended from one of the top sides of the triangle shaped plate 22, at a distance of "a". During firing of the tea leaves, the leaves collecting plate 24 rotates followed by rotation of the pot body 1 to agitate the tea leaves contained inside.

When the fired leaves are to be taken out of the firing pot 1 after completion of a firing operation, the pot body 1 is reversely rotated, so that the fired leaves are shifted towards the discharge side of the pot body 1 along the thin plate 23 and discharged by placing the netting disk 4 on the same side apart from the firing pot body 1. The space "a" provided at the center of the leaves collecting plate 24 can prevent excessive firing or scorching due to tea leaves being accumulated between the triangle shaped plate 22 and the thin plate 23 during leaves firing operation.

On the outside of the pot body net side, is provided a blowing and exhausting fan 38, which exhausts volatile matter generated during operation and reduces the inside temperature of the pot 1 at the end period of the firing operation. The volatile matter leads to the creation of "nama-boke".

Furthermore, in order to prevent excessive rise of the inner pressure of the pot body 1 during the leaves firing operation, a pressure gauge 25 and a safety exhaust valve 26 are provided on the bottom of the steel pipe 21 which opens inside of the pot 1 and is located at the central section of the net side of the pot 1. Further, an opening and closing valve 49 is provided to prevent quick release of steam when the air-tight covers 11 and 16 are released in the release process of built-up steam.

When processing tea leaves of high adhesion such as "gyokuro" tea, an agitator can be installed at the open section of the end of the steel pipe 21 in the firing pot 1.

The raw tea leaves supply section 27 of this invented tea leaves firing equipment is equipped, for example, with a hopper 28, and feeds the tea leaves into the hopper 28 in turn through raw tea leaves feeding conveyor 29 from raw tea leaves storage section 46. The raw tea leaves supply section 27 is installed on the discharge side of the firing pot 1. The tip of the hopper 28 is attached with tea leaves charging cylinder 30, which can be half inclined on the axis 45 so that the horizontal movement of the netting disk 4 and the air-tight cover 11 cannot be interrupted. Tea leaves charging port 31 at the end of the tea leaves charging cylinder 30 can be horizontally moved to be inserted into the central opening 8 of the netting disk.

Fire bag 32 in this invention is a fire bag chamber usually made of refractory material such as a steel structure, consisting of heating section 33 on the bottom and gas exhaust port 34 on the top, with an opening section to accommodate the pot body 1 at the center. The heating section 33 usually uses a gas burner, because it is better to provide free control of heating temperature. It is also convenient that the gas exhaust port 34 can be used to adjust inside temperature of the fire bag by means of exhaust gas control valve 35.

Tea leaves dispersing unit 41 has several blades and is provided on conveyor 36 to prevent uneven cooling when a sizable amount of tea leaves fall down on the conveyor 36 at the tea leaves falling section of the discharge section 3 of the pot body 1. It is desirable that the tea leaves dispersing unit 41 should rotate in the opposite direction against the running direction of the conveyor 36 to convey the fired tea leaves on the conveyor 36 with a uniform thickness.

For fired tea leaves collection, the conveyor 36 is provided under the discharge section 3 of the pot body 1 to collect and discharge the fired tea leaves. It is better to install fired tea leaves cooling unit 37 at its end.

The tea leaves firing method using the tea leaves firing equipment of this invention is as follows.

The netting disk 4 is attached to the opening section 3 of the pot body 1 through driving the cylinder rod 5 fixed on the netting disk 4 by hydraulic unit or air compressor 6, to couple the fitting section 10 of the netting disk 4 with the edge of the pot body 1. On this occasion, the connection of the netting disk 4 is properly performed with the guide rod 7. On the other hand, the air-tight cover 11 is placed apart from the firing pot 1. Then, the pot proper 1 is rotated, the safety gas exhaust valve 26 with an opening and closing valve 49 on the steel pipe 21 is operated, and the blowing and exhausting fan 38 is rotated for exhaustion. Next, the heating section 33 under the fire bag starts operation, and then the firing pot 1, coupled with the disk 4, is rotated and heated. When the inner and outer wall surfaces of the pot 1 are heated up to 180 to 330° C., the tea leaves charging cylinder 30 is half inclined on the axis 45 so that the tea leaves charging port 31 at its end can be kept at the position of the opening section 8 at the center of the netting disk 4 coupled with the pot 1. In this state, the tea leaves charging port 31 is horizontally moved by air compressed cylinder, and inserted into the opening section 8 of the netting disk. The raw tea leaves are then charged in turn into the pot 1 through the raw tea leaves feeding conveyor 29 from the tea leaves charging port 31.

The amount of the raw tea leaves supplied depends on the capacity of the firing pot 1 or the kind of tea. However, for example, about 8 to 10 kg of raw tea leaves is appropriate as a supply amount for one firing pot of 760l in capacity.

After completion of raw tea leaves charging into the firing pot 1, the tea leaves charging port 31 is moved away from the netting disk opening section 8, the tea leaves charging cylinder 30 is turned in reverse on the axis 45, and moved upward out of the shifting range of the air-tight cover 11. The raw tea leaves fed into the firing pot 1 are agitated and heated by the temperature and rotation of the pot 1 and the agitation of the tea leaves collection plate 24 in the pot 1, to generate the volatile matter in the raw tea leaves, which may cause "nama-boke". The volatile matter is exhausted by blowing and exhausting fan 38, and discharged from the firing pot 1.

Immediately after that, the air-tight cover 11 covers the opening section 8 and net section 9 of the netting disk 4 by operating the hydraulic unit 14 through the cylinder rod 13 fixed on the air-tight cover, so that the air-tight cover fitting section 12 on the circumferential edge of the air-tight cover 11 can couple with the projected part 15 on the circumferential edge of the net section of the disk 4.

At the same time, the cylinder rod 39 fixed on the air-tight cover 16 on the net side of the firing pot 1 is shifted by hydraulic unit or air compressor 40 so that the projected part 19 on the circumferential edge of the pot proper 1 is coupled with the fitting section 20 of the air-tight cover 16. The firing pot is thus sealed. During this process, the firing pot continues to be heated and rotated. Firing and steaming are performed at a pressure in the pot of about 1.2 kg (absolute pressure), and at a tea temperature of 102 to 104° C.

During this period, the tea leaves in the firing pot are subjected to saturated steam hotter than atmospheric pressure steam due to the moisture generated from the tea leaves. Since the tea leaves are rotated and agitated in this steam, the oxidation enzyme can become completely inert. The inner pressure of the firing pot may be reduced by opening and closing valve 49. Then, after about 20 to 90 seconds, heating of the heating section 33 is reduced, and the air-tight covers on both sides are moved off the pot proper 1. The filled steam is quickly exhausted by the blowing and exhausting fan 38 to decrease the tea leaves temperature in the pot 1. Then, a tea leaves vibration operation is performed, continuing rotation, agitation, and exhaustion at a tea leaves temperature of 80 to 60° C.

By this operation, tea leaves vibration without the occurrence of "mure" in the tea leaves is performed. Then, heating from the heating section 33 is stopped to further reduce the temperature in the firing pot 1. Afterward, the netting disk 4 is horizontally shifted off the pot 1, and the blowing and exhausting fan 38 is turned for blowing. Strongly blowing, the firing pot 1 is turned reversely. The fired leaves are then moved along the side face of the triangle shaped plate 22 of the tea leaves collecting plate 24, fall from the bottom of opening 8 of the pot 1 along the thin plate 23 through the tea leaves takeout plate 44, and are taken out by the fired tea leaves take-out conveyor 36.

Better results are obtained if the tea leaves are heated by remote infrared ray, near infrared ray, micro wave, etc., in addition to the heating section 33. If this method is adopted, a remote infrared ray generating device is installed on the inner wall surface of the pot 1 and/or the projected part of the steel pipe in the pot 1, for emitting remote infrared rays.

The kind and shape of the remote infrared ray generating device used is variable. For example, it is sufficient if the device can contact and heat the tea leaves in the firing pot 1 by adding electric energy to remote infrared ray generating ceramics or heating them from the heating section. The emission of remote infrared rays, etc., can increase the heating speed of the tea leaves and densely maintain the chlorophyll content of tea leaves, which generates good flavor.

The heating efficiency and heating speed of the tea leaves treatment can be increased by emitting the remote infrared rays, etc., at the center of the firing pot 1. In this case, the remote infrared ray generating device is installed on the end of the steel pipe 21 in the pot 1.

When a remote infrared ray generating device is provided at the center of the firing pot, it may happen that the tea leaves being processed accumulate on the remote infrared ray generating device due to movement of the tea leaves in the rotating firing pot 1, which brings about uneven emission of the remote infrared rays. In such a case, the remote infrared ray generating device itself is made to rotate, or the material which can be penetrated with remote infrared rays, such a glass or the like, is made to rotate and the remote infrared ray generating device is installed in it. Otherwise, it will do that ceramics are gunned onto the inner surface of the firing pot 1 to generate the remote infrared rays.

In the production of fired tea leaves using the tea leaves firing device of this invention, a sequencer can be provided to carry out automatic control for stable and repetitive operation and production of uniform products. The sequencer sets the following items at each process step of raw tea leaves charging, "nama-boke" discharging, firing and steaming, tea leaves vibrating, fired leaves taking-out, etc., depending on the nature of the tea leaves or the properties required for the product tea. There is a period and time of ignition, extinguishment, and switch-over of firing power for the heating section 33; period, time, and speed of rotation and reverse rotation of the firing pot 1; period, time and speed of change-over for start, stop, rotation, and reverse rotation of the blowing and exhausting fan 38; period and time for connection and disconnection of the netting disk 4 with the air-tight covers 11 and 16; period and time of start and stop for raw tea leaves supply unit 27; period and time of start and stop for conveyor 36, etc.

For such an automatic control operation of the equipment of this invention, a temperature sensor (inside wall temperature sensor) 42 is embedded on the inside of the firing pot 1, and an atmospheric temperature sensor (exhaust gas temperature sensor) 43 which can detect the inside temperature of the firing pot is installed near the blowing and exhausting fan 38 outside the pot 1. By the temperature sensed, the time for start and stop of the various machines can be automatically controlled.

The temperature of the firing pot bottom can be sensed by a non-contact thermometer (for example, thermo-eye) from the outside of the netting disk opening section 8. Alternatively, the top of the fire bag 32 is drilled, and the outer surface temperature of the firing pot is detected by non-contact thermometer 50 from the outside. This is also one of the method for temperature detection.

These temperatures-rotation, reverse rotation of the firing pot 1; connection and disconnection of the netting disk 4; connection and disconnection of the air-tight covers 11 and 16 on both sides; rotation, stop, and reverse rotation of the blowing and exhausting fan 38; start and stop of raw tea leaves supply section 27; and the revolution speed of the blowing and exhausting fan 38-are all set and controlled by an inverter, and memorized in the sequencer.

It has recently been published that gabaron tea is a good health food which is very effective for high blood pressure, because it contains a lot of r-amino butyric acid (gabaron) manufactured when raw tea leaves are put into an oxygen lacking state and the oxidation enzyme becomes inert. In the tea leaves firing equipment of this invention, nitrogen gas or carbonic acid gas is injected into the firing pot during the period when oxidation enzyme is inert to reduce the oxygen, through which method the oxidation enzyme becomes inert. Alternatively, during exhaustion of "nama-boke", air blow is avoided as far as possible and the pot is made air-tight inside for as long as possible by operating the exhausting fan to produce a state of oxygen shortage, resulting in inert oxidation enzyme. Thus, gabaron can be produced.

One example where the equipment of this invention is operated by automatic control will be discussed below.

(1) Heating of the firing pot
With the netting disk 4 coupled with the pot body 1, ignite the burner of the heating unit 33 with large firing, and start a weak rotation of the firing pot proper 1.

(2) Charging of raw tea leaves
At the time when the temperature sensor in the firing pot detects a temperature of 230 to 330° C., rotate the tea leaves charging cylinder 30, insert the tea leaves charging port 30 into the opening 8 of the netting disk, and charge 8 kg of raw tea leaves into the pot 1 for about 10 to 30 seconds.

(3) Exhaustion of nama-boke 10 to 50 seconds after completion of the operation above, start and continue weak operation of the blowing and exhausting fan 38 for exhaustion until the exhausting gas temperature sensor 43 detects a temperature of about 45 to 74° C.

(4) Firing and steaming

At the time when the exhausting gas temperature sensor 43 detects a temperature of about 454 to 754° C., shift the airtight covers 11 and 16 on both sides in the direction of the pot body 1, make the inside of the pot 1 air-tight, switch over the rotation speed to strong operation, and continue the operation for 30 to 90 seconds.

(5) Exhaustion of filled-up steam

Immediately after completion of the above operation, extinguish the burner of the heating unit 33, shift the air-tight covers 11 and 16 in the opposite direction to the firing pot 1, and start and continue strong operation of the blowing and exhausting fan 38 for exhaustion for 3 to 5 seconds.

(6) Tea leaves vibration

Immediately after completion of the above operation, ignite weakly the burner of the heating unit 33, change over the blowing and exhausting fan 38 to middle operation, and continue the operation for about 3 minutes.

(7) Taking-out

Immediately after completion of the above operation, reversely rotate the firing pot 1 strongly, change over the burner of the heating unit 33 to strong firing, shift the netting disk 4 in the direction opposite to the pot body 1, change over the blowing and exhausting fan 38 to strong blowing, start operation of fired leaves take-out conveyor 36 and simultaneously operate cooling.

The operations described so far are repeated.

Figure 5:
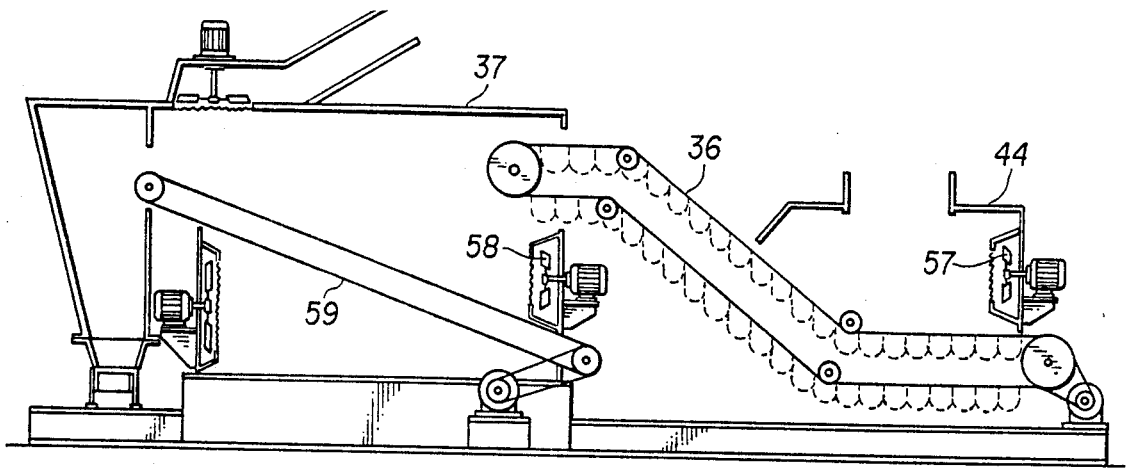
FIG. 5 is a side plan view of the tea leaves collecting portion of the equipment shown in FIG. 4.

Another embodiment of the present invention is shown in FIGS. 4 and 5.

Although the equipment of FIGS. 4 and 5 basically employs the general machine configuration and the tea leaves firing and manufacturing method described in FIG. 1, FIG. 2, and FIG. 3, some parts are newly-contrived in the tea leaves firing equipment. Therefore, an example of the new features not shown in FIG. 1, FIG. 2, and FIG. 3 will be discussed below.

Inside the tea leaves firing pot of FIGS. 4 and 5, a radiating cylinder 51 in the pot is heated, for example, by radiating cylinder heating burner 52 to produce far infrared rays, etc., and radiate them into the pot, thus more effectively processing tea leaves.

Raw tea leaves agitating blades 54 are also installed at the place where the hopper 28 provided upstream of raw tea leaves supply section 27 and raw tea leaves supply screw 55 meet. Blades 54 agitate raw tea leaves to prevent adherence or clogging at that meeting place. At the same time, the horizontal relative position of a hopper upper part and lower part (screw section) is made to be variable (to be movable whenever needed), for prevention of clogging of raw tea leaves.

In addition, the fired tea transfer conveyor 36 of the fired tea leaves collection section in this equipment is provided with a universal net hanger conveyor which can turn universally. It enables not only the conveyance of a large amount of tea leaves, but also gives good ventilation. When the conveyor is turned, the tea leaves are completely dispersed and fallen, to eliminate clogging or lumping of the tea leaves at the net.

Further, it is more effective to install a fired leaves loading and cooling fan at the fired leaves take-out plate 44, in order to properly load the fired tea leaves on the fired tea leaves transfer conveyor 36. Fired tea leaves cooling fan 58 is installed at the place where it touches the fired leaves cooling section 37. Then, the same effect can be gained with the cooling conveyor 59.

Certain details about FIG. 4 and FIG. 5 have been described so far. For other items, refer to the description of like-numbered elements in FIG. 1, FIG. 2, and FIG. 3.

What is claimed is:

1. An apparatus for processing raw tea leaves comprising a cylindrical chamber means for firing raw tea leaves, said chamber means having an open side, a second side opposite said open side having a netted surface, and a tea leaves collecting plate means arranged in said chamber means for discharging fired tea leaves from said chamber means through said open side; control means for rotating said chamber means in a first direction and in a second direction opposite to said first direction; heating means arranged about said chamber means for heating raw tea leaves in said chamber means; round disk means having a netted surface and means defining a central opening in said netted surface; first hydraulic means for moving said round disk means horizontally into and out of engagement with said open side of said chamber means; first air-tight cover means adapted to engage said round disk means to cover said open side of said chamber means when said round disk means is engaged with said open side; second hydraulic means for moving said first air-tight cover horizontally into and out of engagement with said round disk means; second air-tight cover means adapted to engage said netted surface of said second side of said chamber means to cover said second side; third hydraulic means for moving said second air-tight cover horizontally into and out of engagement with said netted surface of said second side of said chamber means; and transfer means for supplying raw tea leaves to said chamber means through said central opening in said round disk means, said transfer means comprising port means adapted to engage said central opening in said netted surface of said round disk means and retractable chute means connected to said port means, arranged above said first air-tight cover and said round disk means and adapted to move said port means down and into engagement with said central opening of said round disk means when said round disk means is engaged with said open side of said chamber means and said first air-tight cover is not engaged with said round disk means.

2. An apparatus according to claim 1, further comprising radiating cylinder means arranged inside said chamber means for additional heating of the tea leaves in said chamber means.

3. An apparatus according to claim 1, further comprising first coupling means for assisting in the engagement of said round disk means and said first air-tight cover, and second coupling means for assisting in the engagement of said second air-tight cover means and said netted surface of said second side of said chamber means.

4. An apparatus according to claim 1, wherein said transfer means further comprises hopper means for containing raw tea leaves, supply means for transferring raw tea leaves from said hopper means to said retractable chute means, agitator means for agitating raw tea leaves as they are transferred from said hopper means to said supply means, and adjusting means for varying the relative position of said hopper means and said supply means to prevent clogging thereof by raw tea leaves.

5. An apparatus according to claim 1, further comprising cooling means arranged outside of said chamber means, and conveyor means for conveying fired tea leaves discharged from said open side of said chamber means by said tea leaves collecting plate means to said cooling means, said conveyor means comprising a flexible net hanger conveyor.

6. An apparatus according to claim 5, further comprising first fan means for spreading fired tea leaves discharged from said chamber means onto said conveyor means, and second fan means for spreading fixed tea leaves onto said cooling means from said conveyor means.

7. An apparatus according to claim 1, further comprising control means for regulating temperature and pressure inside said chamber means.

8. An apparatus according to claim 1, further comprising fan means arranged at said second side of said chamber means between said netted surface and said second air-tight cover for exhausting volatile matter from inside said chamber means and reducing temperature inside said chamber means after said raw tea leaves have been fired.

* * * * *